E. C. SWETT.
LIQUID GAGE FOR TANKS.
APPLICATION FILED JULY 25, 1910.
1,000,208.
Patented Aug. 8, 1911.
2 SHEETS—SHEET 1.
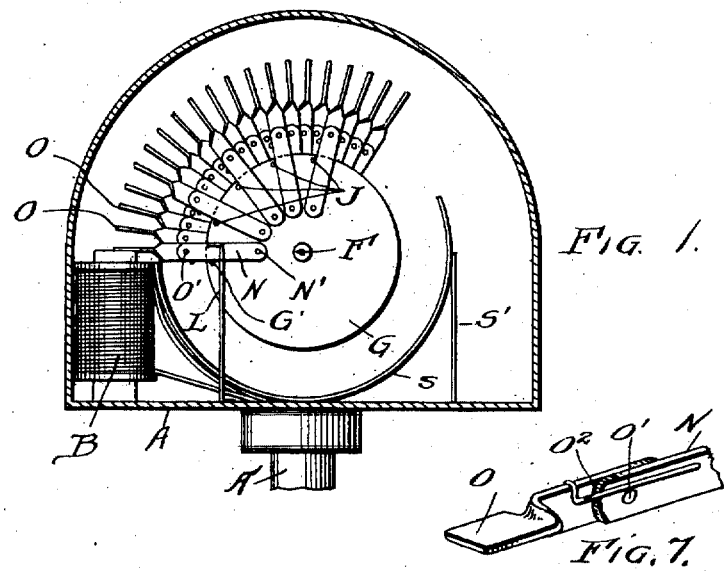
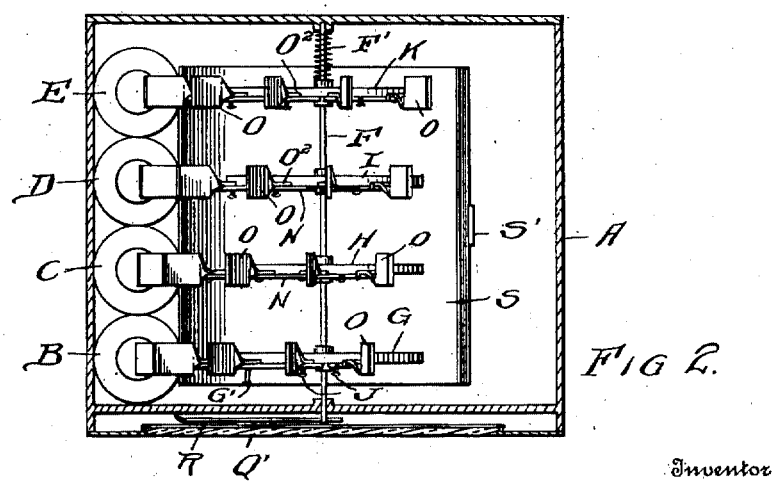

E. C. SWETT.
LIQUID GAGE FOR TANKS.
APPLICATION FILED JULY 30, 1910.

1,000,208.

Patented Aug. 8, 1911.

1,000,208. LIQUID-GAGE FOR TANKS. Edward C. Swett, Beloit, Wis. Filed July 25, 1910. Serial No. 573,716.

*To all whom it may concern:*

Be it known that I, Edward C. Swett, a citizen of the United States, residing at Beloit, in the county of Rock and State of Wisconsin, have invented certain new and useful Improvements in Liquid-Gages for Tanks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in liquid gages for tanks in which an intermittent rotary movement is adapted to be imparted to a shaft carrying an indicating pointer movable adjacent to a dial and actuated by electro-magnetic force, the magnets being energized by the closing of circuits as a float rises and falls within the tank.

My invention comprises various details of construction and combinations and arrangements of parts which will be hereinafter fully described and then specifically defined in the appended claims.

I illustrate my invention in the accompanying drawings, in which:—

Figure 3:
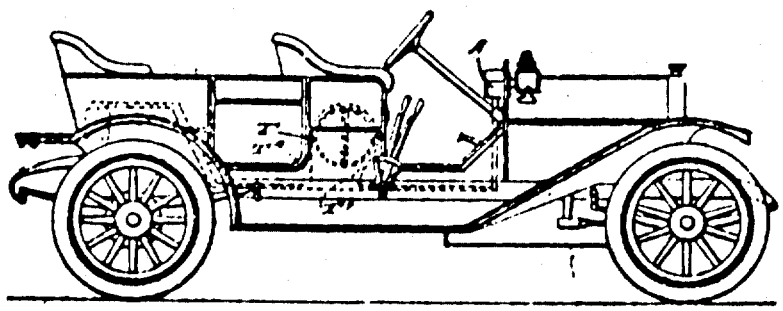
Figure 4:
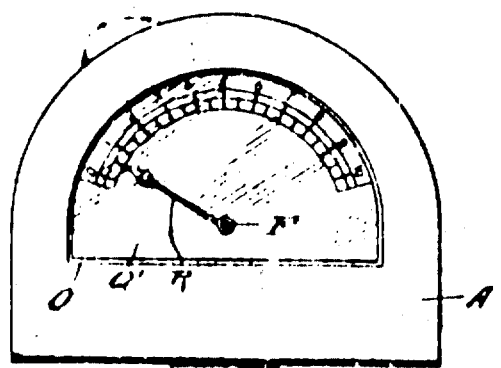
Figures 5, 6:
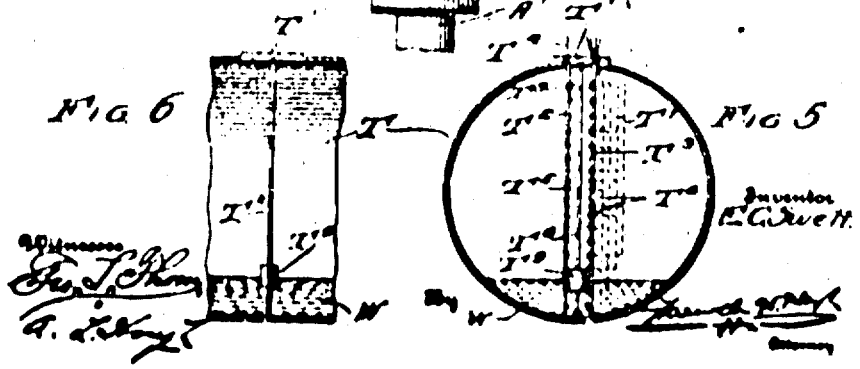

Figure 1 is a sectional view through a casing showing the electro-magnet and contact arms in elevation. Fig. 2 is a cross sectional view through the casing showing in top plan view the parts illustrated in Fig. 1 of the drawings. Fig. 3 is an elevation of an automobile showing the application of the invention thereto. Fig. 4 is a side elevation of a dial and indicating pointer movable adjacent thereto. Fig. 5 is a sectional view through the tank showing the float and the contact points coöperating with the float to close circuits, and Fig. 6 is a longitudinal section at right angles to that shown in Fig. 5. Fig. 7 is a detail view of a spring and a link actuated thereby forming a part of the invention.

Reference now being had to the details of the drawings by letter, A designates a casing which may be of any size and shape and supported by the standard A' and contained within said casing is a series of electro-magnets, designated by letters B, C, D and E. Mounted in suitable bearings in the walls of the casing is a rotatable shaft F upon which a coiled spring F' is mounted, one end being fixed to the casing and the other end to the shaft, the purpose of which spring is to normally return the shaft to its starting position after having been given a rotary movement sufficient to indicate any height of liquid within the tank. Fixed to said shaft are the disks G, H, I and K, and J designates pins projecting from corresponding faces of the disks and spaced apart. A series of links N is mounted upon the pins N' which project from each disk and to each link is pivotally connected, by means of a pin O', a second link O and a spring O² is provided for the purpose of normally holding each pair of links in the position shown in solid lines in Fig. 1 of the drawings.

Upon reference to Figs. 1 and 2 of the drawings, it will be noted that the links are arranged in alternate relation one to another and to each disk are pivotally connected five of the links N each link upon each disk designating one of the sub-divisions of the dial Q which shows numerals from zero to 10, a suitable indicating pointer R, which is fastened to the shaft F, serving to register adjacent to the dial, said dial being covered by a glass Q'.

Projecting from the disk G is a pin G' which is longer than the other pins thereon and is adapted to coöperate with the hooked end of the resilient bar L to limit the return movement of the shaft and prevent a further rotary movement when the indicator returns to zero. Underneath the series of disks is a concaved shield S, against which the outer free ends of the links O are adapted to project as the shaft rotates and after the links O tilt at their pivotal joints as one contact after another with the electro-magnet breaks, and S' is a brace rising from the bottom of the casing A and engaging the shield S.

Referring to Figs. 5 and 6 of the drawings there will be seen a tank T adapted to contain the fuel having an opening closed by means of the plug T'. Fixed to said plug are the two tubes T² and T³ which are parallel to each other and spaced apart a slight distance.

T⁴ designates a wire adapted to be connected to one pole of the electro-magnet and which passes throught the tube T² and has a series of contact points T⁵ electrically connected therewith. The second tube T³ also has a series of contact points T⁶, each of which has a wire T⁷ connected thereto each wire being adapted to be connected to one of said electro-magnets. A rod T⁸ is also fastened to the plug T' and is positioned intermediate the tubes T² and T³ and a float T⁹ is provided which is centrally apertured to receive the rod upon which it is guided as it rises and falls with the liquid fuel W within the tank. Said float T⁹, it will be noted, is of such a length as to always make contact with two pairs of the contact points as it rises and falls within the tank.

In operation, it will be noted that two of the links O will at all times be within attracting distances of adjacent magnets, When the tank is full and the float is at its highest limit, as shown in dotted lines in Fig. 5, said float will be in contact with the two uppermost of the contact points which will cause the lowermost of the links O to be drawn into contact with the first electro-magnet B. This will cause the pointer to indicate opposite the highest numeral 10 upon the dial, indicating the tank to be full. As the float falls and comes into contact with the next lower pair of contact points, the third link O will move into position to be within the zone of magnetic attractive force of the third electro-magnet D and the second link O will be drawn into contact with the electro-magnet C, the first link which was drawn into contact with the electro-magnet B tilting upon its pivotal pin O' and being thrown out of contact with the electro-magnet B and its free end will contact with the concaved surface of the shield. This operation is repeated, each alternately arranged link O coming in contact with the electro-magnets in order as the float falls. When the fourth of the series of links of the lower end comes in contact with the electro-magnet E, the second link O upon the first disk G will be brought within the zone of attraction of the electro-magnet B and so on until the float reaches its lowest limit where the pointer K will designate zero or liquid nearly exhausted from the tank. After all of the links O have been drawn into contact with the different magnets which cause the indicating pointer to swing to its limits in opposite directions, the shaft F will be returned to its normal position by the influence of the spring F" and the link O will be thrown to its normal position by the influence of the spring O² and the apparatus will be in readiness for operation again when the tank is refilled.

While I have shown my liquid gage as applied to an automobile to which it would be well adapted, it will be understood that it may be used equally well in connection with various forms of recording instruments in any units, gallons, inches, etc.

What I claim to be new is:—

1. A liquid gage for tanks comprising a liquid fuel receptacle, a float movable therein, a series of electrical terminals against which said float is adapted to contact, circuits closed by said float, a series of electro-magnets energized by the closing of said circuits, a rotatable shaft, disks fixed thereto and an indicating pointer fixed thereto, a series of pivotal jointed links mounted upon said disks and adapted to be successively drawn into contact with said electro-magnets as the float falls and comes in contact with various terminals, and a dial adjacent to which said pointer moves.

2. A liquid gage for tanks comprising a liquid fuel receptacle, a float movable therein, a series of electrical terminals against which said float is adapted to contact, circuits closed by said float, a series of electro-magnets energized by the closing of said circuits, a rotatable shaft, disks fixed thereto and an indicating pointer fixed thereto, a series of jointed spring-actuated links mounted upon said disks and adapted to be successively drawn into contact with said electro-magnets as the float falls and comes in contact with various terminals, and a dial adjacent to which said pointer moves.

3. A liquid gage for tanks comprising a liquid fuel receptacle, a float movable therein, a series of electrical terminals against which said float is adapted to contact, circuits closed by said float, a series of electro-magnets energized by the closing of said circuits, a rotatable shaft, disks fixed thereto and an indicating pointer fixed to said shaft, a series of jointed spring-actuated links mounted upon said disks and adapted to be successively drawn into contact with said electro-magnets as the float falls and comes in contact with various terminals, a dial adjacent to which said pointer moves, and a concaved shield against which the free ends of the links contact as the shaft rotates.

4. A liquid gage for tanks comprising a liquid fuel receptacle, a float movable therein, a series of electrical terminals against which said float is adapted to contact, circuits closed by said float, a series of electro-magnets energized by the closing of said circuits, a rotatable shaft, disks fixed thereto and an indicating pointer fixed to said shaft, a series of jointed spring-actuated links mounted upon said disks and adapted to be successively drawn into contact with said electro-magnets as the float falls and comes in contact with various terminals, a dial adjacent to which said pointer moves, a concaved shield against which the free ends of the links contact as the shaft rotates, and means for returning the shaft to its normal position after the series of links has been brought into contact with the electro-magnet.

5. A liquid gage for tanks comprising a liquid fuel receptacle, a float movable therein, a series of electrical terminals against which said float is adapted to contact, circuits closed by said float, a series of electro-magnets energized by the closing of said circuits, a rotatable shaft, disks fixed thereto and an indicating pointer fixed to said shaft, a series of jointed spring-actuated links mounted upon said disks and adapted to be successively drawn into contact with said electro-magnets as the float falls and comes in contact with various terminals, a dial adjacent to which said pointer moves, a concaved shield against which the free ends of the links contact as the shaft rotates, means for returning the shaft to its normal position after the series of links has been brought into contact with the electro-magnet, and means for limiting the rotary movement of the shaft in one direction.

6. A liquid gage for tanks comprising a liquid fuel receptacle, a float movable therein, a series of electrical terminals against which said float is adapted to contact, circuits closed by said float, a series of electro-magnets energized by the closing of said circuits, a rotatable shaft, disks fixed thereto and an indicating pointer fixed to said shaft, a series of jointed spring-actuated links mounted upon said disks and adapted to be successively drawn into contact with said electro-magnets as the float falls and comes in contact with various terminals, a dial adjacent to which said pointer moves, a concaved shield against which the free ends of the links contact as the shaft rotates, means for returning the shaft to its normal position after the series of links has been brought into contact with the electro-magnet, a pin projecting from one of the disks, and a stationary hook against which said pin is adapted to contact to limit the rotary movement of the shaft in one direction.

7. A liquid gage for tanks comprising a liquid fuel receptacle having an opening, a plug fitted therein, tubes fixed to said plug parallel to each other, a wire passing through one of said tubes and having terminal contact points, a series of wires mounted in the other tube and having terminal contact points, a float movable between said series of terminal points and adapted to contact therewith as the float falls within the tank, a circuit closed by the float and a series of electro-magnets energized by the closing of said circuit, a spring-pressed rotatable shaft, an indicating pointer and disks fixed to the shaft, a dial adjacent to which said indicating pointer moves, and a series of spring-pressed jointed links pivotally mounted upon said disks and adapted to be alternately brought into contact with said magnets as the float falls within the tank, thereby causing the indicating pointer to register the height of the liquid within the tank.

8. A liquid gage for tanks comprising a liquid fuel receptacle having an opening, a plug fitted therein, tubes fixed to said plug parallel to each other, a wire passing through one of said tubes and having terminal contact points, a series of wires mounted in the other tube and having terminal contact points, a float movable between said series of terminal points and adapted to contact therewith as the float falls within the tank, a rod fastened to the plug and upon which said float moves, a circuit closed by said float, a series of electro-magnets energized as said circuit closes, a spring-pressed rotatable shaft, an indicating pointer and disks fixed to the shaft, a dial adjacent to which said indicating pointer moves, and a series of spring-pressed jointed links pivotally mounted upon said disks and adapted to be alternately brought into contact with said magnets as the float falls within the tank, thereby causing the indicating pointer to register the height of the liquid within the tank.

In testimony whereof I hereunto affix my signature in the presence of two witnesses.

EDWARD C. SWETT.

Witnesses:
JOEL B. DOW,
J. S. DOW.